United States Patent
Yang et al.

(10) Patent No.: US 10,916,158 B2
(45) Date of Patent: Feb. 9, 2021

(54) CLASSROOM TEACHING COGNITIVE LOAD MEASUREMENT SYSTEM

(71) Applicant: CENTRAL CHINA NORMAL UNIVERSITY, Hubei (CN)

(72) Inventors: Zongkai Yang, Hubei (CN); Jingying Chen, Hubei (CN); Sannvya Liu, Hubei (CN); Ruyi Xu, Hubei (CN); Kun Zhang, Hubei (CN); Leyuan Liu, Hubei (CN); Shixin Peng, Hubei (CN); Zhicheng Dai, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 0 days.

(21) Appl. No.: 16/697,205

(22) Filed: Nov. 27, 2019

(65) Prior Publication Data

US 2020/0098284 A1 Mar. 26, 2020

Related U.S. Application Data

(63) Continuation of application No. PCT/CN2018/118077, filed on Nov. 29, 2018.

(30) Foreign Application Priority Data

Jul. 13, 2018 (CN) .......................... 2018 1 0770782

(51) Int. Cl.
*G09B 19/00* (2006.01)
*G06K 9/00* (2006.01)
(Continued)

(52) U.S. Cl.
CPC ......... *G09B 19/00* (2013.01); *G06K 9/00268* (2013.01); *G06K 9/00302* (2013.01);
(Continued)

(58) Field of Classification Search
CPC ... G09B 5/00; G09B 5/02; G09B 7/00; G09B 19/00; G06K 9/003; G06K 9/00302; G06K 9/00308; G06K 9/00221; G06K 9/00295
See application file for complete search history.

(56) References Cited

U.S. PATENT DOCUMENTS

2004/0152060 A1 *  8/2004 Ando ...................... G09B 7/00
                                                    434/308
2018/0018540 A1 *  1/2018 Hazur ................. G06K 9/00335

FOREIGN PATENT DOCUMENTS

CN        101840506      2/2014
CN        107025616      8/2017

* cited by examiner

*Primary Examiner* — Robert J Utama
(74) *Attorney, Agent, or Firm* — JCIP Global Inc.

(57) ABSTRACT

The invention provides a classroom cognitive load detection system belonging to the field of education informationization, which includes the following. A task completion feature collecting module records an answer response time and a correct answer rate of a student when completing a task. A cognitive load self-assessment collecting module quantifies and analyzes a mental effort and a task subjective difficulty by a rating scale. An expression and attention feature collecting module collects a student classroom performance video to obtain a face region through a face detection and counting a smiley face duration and a watching duration of the student according to a video analysis result. A feature fusion module fuses aforesaid six indexes into a characteristic vector. A cognitive load determining module inputs the characteristic vector to a classifier to identify a classroom cognitive load level of the student.

16 Claims, 4 Drawing Sheets

(51) Int. Cl.
*G06K 9/62* (2006.01)
*G06Q 50/20* (2012.01)
*G09B 7/00* (2006.01)

(52) U.S. Cl.
CPC ........ *G06K 9/00711* (2013.01); *G06K 9/6256* (2013.01); *G06Q 50/20* (2013.01); *G09B 7/00* (2013.01)

CLASSROOM TEACHING COGNITIVE LOAD MEASUREMENT SYSTEM

CROSS-REFERENCE TO RELATED APPLICATION

This application is a continuation of international PCT application Ser. No. PCT/CN2018/118077, filed on Nov. 29, 2018, which claims the priority benefit of Chinese application no. 201810770782.5, filed on Jul. 13, 2018. The entirety of each of the above-mentioned patent applications is hereby incorporated by reference herein and made a part of this specification.

TECHNICAL FIELD

The invention belongs to the field of educational informatization technology, and more particularly, relates to a classroom teaching cognitive load measurement system.

BACKGROUND

Cognitive load is the total amount of information applied to working memory to be processed. Working memory, also known as short-term memory, is primarily responsible for obtaining and temporarily storing information in the current context and associating with information in long-term memory to gain an overall understanding of a task. Because working memory is limited in capacity, when target information in a learning environment is overly great or presented inappropriately, a learner can easily experience an overloaded capacity of working memory that affects a cognitive processing of the learner. The application of cognitive load theory in teaching is to minimize external cognitive load caused by organization and presentation of learning materials, so as to improve a learning effect. Therefore, it is necessary to study a cognitive load measurement in classroom teaching.

The cognitive load measurement mainly considers three aspects, including: a mental load, a mental effort and a behavioral performance. At present, there are three main categories of evaluation indexes, including subjective assessment, task performance and physiological indexes. A subjective measurement is a measurement method for assessing and reporting a cognitive load level based on a difficulty of a learning task and a required mental effort of the learner; a task performance measurement is a measurement method for testing the learner who have learnt the task for a certain time so cognitive load can then be evaluated based on the obtained score; a physiological measurement is a measurement method for objectively measuring a cognitive load based on changes in the corresponding physiological index caused by cognitive processing.

With the rapid development of information technology in the field of education, the application of educational information technology has been continuously expanded and deepened. For a classroom teaching cognitive load, a computer can be used to measure the cognitive load of an observation target through a series of information obtained from the observation target, such as visual, physiological signals and interactive information. The existing measurements for the classroom teaching cognitive load do not fully consider the three aspects of the mental load, the mental effort and the behavioral performance, and cannot directly complete all the measurements for the indexes in classroom teaching.

SUMMARY

In view of the problems and improvement requirements of the prior art, the invention provides a classroom teaching cognitive load measurement system. The invention can be applied to objectively, quickly and accurately rate the cognitive load of the student in the classroom as a reference to help the teacher to improve the organization and presentation of learning materials and reduce the external cognitive load caused thereby so the teaching effect can be improved.

A classroom teaching cognitive load measurement system, including:

a task completion feature collecting module for recording an answer response time and a correct answer rate of a student when completing a task;

a cognitive load self-rating collecting module for receiving a cognitive load self-rating scale input by the student when completing the task, and quantifying and analyzing a mental effort and a task subjective difficulty of the student by the cognitive load self-rating scale;

an expression and attention feature collecting module for collecting a student classroom performance video to obtain a face region through a face detection; performing a face recognition on the obtained face region to complete an expression recognition and a head pose estimation; counting a smiley face duration of the student according to a result of the expression recognition and counting a watching duration of the student according to a result of the head pose estimation;

a feature fusion module for fusing six indexes including the answer response time, the correct answer rate, the mental effort, the task subjective difficulty, the smiley face duration and the watching duration into a characteristic vector; and a cognitive load determining module for inputting the characteristic vector to a trained classifier to identify a classroom cognitive load level of the student.

Further, the expression and attention feature collecting module includes:

a monitoring data collecting module comprising a plurality of cameras for capturing a scene image in a classroom;

a face detecting module for detecting the face region from the scene image; and a multitask face analyzing module for performing the face recognition, the expression recognition and the head pose estimation by using models pre-trained.

Further, the model for the face recognition is trained by:

(1) using a visual geometry group (vgg)-face face database, and selecting a VGG model to train the model for the face recognition for a first time; and (2) optimizing the model for the face recognition obtained from the training step (1) by using a face image of the student in the classroom.

Further, the model for the expression recognition and the head pose estimation is trained by:

(3) a network initialization, wherein a visual geometry group (VGG) network is constructed and parameters in the VGG network are initialized by parameters of the model for the face recognition trained in the step (2); a first fully connected layer (FC1) in the VGG network is replaced with a latent variable analysis (LVA) layer; a second fully connected layer (FC2) is replaced with two marginal Fisher analysis (MFA) layers: an MFA_S layer and an MFA_H layer; the MFA_S layer and the MFA_H layer are then connected to a third fully connected layer (FC3) respectively, and the two branches are used in a smiley face recognition and the head pose estimation, respectively;

(4) an LVA layer training, including: performing a hidden variable modeling $t=Us+Vh+\bar{t}+\varepsilon$ on an observed quantity output by a convolution layer, t being the observed quantity output by the convolution layer, s and h representing a smiley face feature hidden variable and a head pose feature hidden variable respectively, $\bar{t}$ representing a mean, $\varepsilon$ being a Gaussian noise, $\sigma$ being a variance, U and V being transformation matrixes; outputting samples to the model for the smiley face recognition and head pose estimation, and solving a model parameter $\theta=\{U, V, \bar{t}, \sigma\}$ through a maximized likelihood function $L_{LVA}=\Sigma_i \ln p_\theta(t_i, h_j, s_k)$, wherein a logarithmic function $\ln p_{74}()$ indicates a likelihood of an i-th sample $t_i$ for having a head pose hidden variable $h_j$ with a head pose belonging to a j-th class and an expression hidden variable $s_k$ with an expression belonging to a k-th class; calculating outputs of the two branches of the LVA layer according to trained parameters, the output of the branch of the expression recognition being $x_s = W_s t + b_s$, wherein $W_s = U^T \Sigma^{-1}$, $b_s = U^T \Sigma^{-1} \bar{t}$; the output of the branch of the head pose being $x_h = W_h t + b_h$, wherein $W_h = V^T \Sigma^{-1}$, $b_h = V^T \Sigma^{-1} \bar{t}$, and a superscript T represents a transposition;

(5) MFA layers training, including: based on an MFA_S layer having an input being the output $X_s$ of the branch of the expression recognition and an output being $y_s = P_s^T x_s$, finding an eigenvector $P_s$ that enables an optimization $$\arg\max_{P_s} \frac{tr(P_s^T S_b P_s)}{tr(P_s^T S_w P_s)}$$

by minimizing an intraclass distance and maximizing an interclass distance, wherein $S_b$ is the interclass distance, and $S_w$ is the intraclass distance; solving the optimization is equivalent to solve an eigenvalue decomposition: $S_b p_s = (S_w + \lambda I) p_s$ with $\lambda$ being an eigenvalue, $P_s$ being the eigenvector, I being a unit matrix; training an MFA_H layer in the same way with an output being the output $X_h$ of the branch of the head pose, an output being $y_h = P_h^T x_h$, and $P_h$ being the eigenvector; and (6) fixing parameters of the LVA layer and the MFA layers, fine-tuning parameters of other network layers to achieve minimizing a total loss function output by the two branches of the LVA layer, so as to obtain the model for the expression recognition and the head pose estimation.

Further, a parameter $\theta=\{U, V, \bar{t}, \sigma\}$ is solved by adopting an EM algorithm, that is, an alternating iteration of an E step and an M step, wherein a calculation formula of the E step is:

$$\langle s_k \rangle = \frac{U^T \Sigma^{-1}}{M_k} \sum_{t_i \in M(k)} (t_i - \bar{t})$$

$$\langle h_j \rangle = \frac{V^T \Sigma^{-1}}{N_j} \sum_{t_i \in N(j)} (t_i - \bar{t})$$

$$\langle s_k s_k^T \rangle = \frac{I - U^T \Sigma^{-1} U}{\sqrt{M_k}} + \langle s_k \rangle \langle s_k \rangle^T$$

$$\langle h_j h_j^T \rangle = \frac{I - V^T \Sigma^{-1} V}{\sqrt{N_j}} + \langle h_j \rangle \langle h_j \rangle^T$$

$$\langle h_j s_k^T \rangle = \frac{-V^T \Sigma^{-1} U}{\sqrt{N_j M_k}} + \langle h_j \rangle \langle s_k \rangle^T$$

$$\langle s_k h_j^T \rangle = \frac{-U^T \Sigma^{-1} V}{\sqrt{N_j M_k}} + \langle s_k \rangle \langle h_j \rangle^T$$

wherein $\Sigma = \delta^2 I + UU^T + VV^T$, $N_j$ represents a sample size of the head pose being the j-th class, $M_k$ represents a sample size of the expression being the k-th class, N(j) represents a sample set of the head pose being the j-th class, and M(k) represents a sample set of the expression being the k-th class; and a calculation formula of the M step is:

$$U = (C - DB^{-1}E)(A - FB^{-1}E)^{-1}$$

$$V = (D - CA^{-1}F)(B - EA^{-1}F)^{-1}$$

$$\sigma^2 = \frac{1}{n*d} \sum_i \{(t_i - \bar{t} - U \langle s_k \rangle - V \langle h_j \rangle)^T (t_i - \bar{t})\}$$

wherein n represents a total of trained samples, and d represents a feature dimension of an observed variation $t_i$.

Here, the parameters $A = \Sigma_i \langle s_k s_k^T \rangle$, $C = \Sigma_i (t_i - \bar{t}) \langle s_k \rangle^T$, $E = \Sigma_i \langle h_j s_k^T \rangle$, $B = \Sigma_i \langle h_j h_j^T \rangle$ $D = \Sigma_i (t_i - \bar{t}) \langle h_j \rangle^T$, $F = \Sigma_i \langle s_k h_j^T \rangle$.

Further, the face detecting module adopts any one of a hierarchical cascading AdaBoost, a Hidden Markov Model (HMM) and a Support Vector Machine (SVM), and a feature used for a detection is any one of a Haar feature, a Sobel feature and a sparse feature.

Further, the classifier adopted by the cognitive load determining module is any one of a self-organizing neural network, an Elman neural network and a support vector machine.

In general, the above technical solutions conceived by the invention have the following beneficial effects compared with the prior art.

The method of the invention utilizes image processing and pattern recognition to obtain the head pose and the facial expression, and achieves a cognitive load rating through extraction and fusion of the six indexes including the response time, the correct answer rate, the mental effort, the task subjective difficulty, the smiley face duration and the watching duration. The invention can objectively, quickly and accurately rate the cognitive load of the student in the classroom, help the teacher to improve the organization and presentation of learning materials and reduce the external cognitive load caused thereby so the teaching effect can be improved.

Further, a multitask deep learning method based on the hidden variable analysis used when the head pose and the facial expression are to be estimated can simultaneously estimate the expression and the head pose and obtain better estimation accuracy.

Further, a cognitive load measurement model is trained in the cognitive load rating by a machine learning, and thus the trained model can better measure and distinguish the cognitive load of the student.

Because the visual processing object of the invention is a large scene image, the method of the invention can be applied to observe multiple students at the same time in parallel and accordingly improve a monitoring efficiency to help the teacher to instantly handle a cognitive load distribution of more students in classroom learning.

DETAILED DESCRIPTION

In order to describe the objective, technical solution and advantages of the invention more clearly, the invention is described in detail below with reference to accompany drawings and embodiments. It should be noted that, the embodiments specifically described here are merely used to describe the invention rather than limit the invention. Further, the technical features involved in various embodiments of the invention described below may be combined together as long as they do not constitute a conflict with each other.

Figure 1:
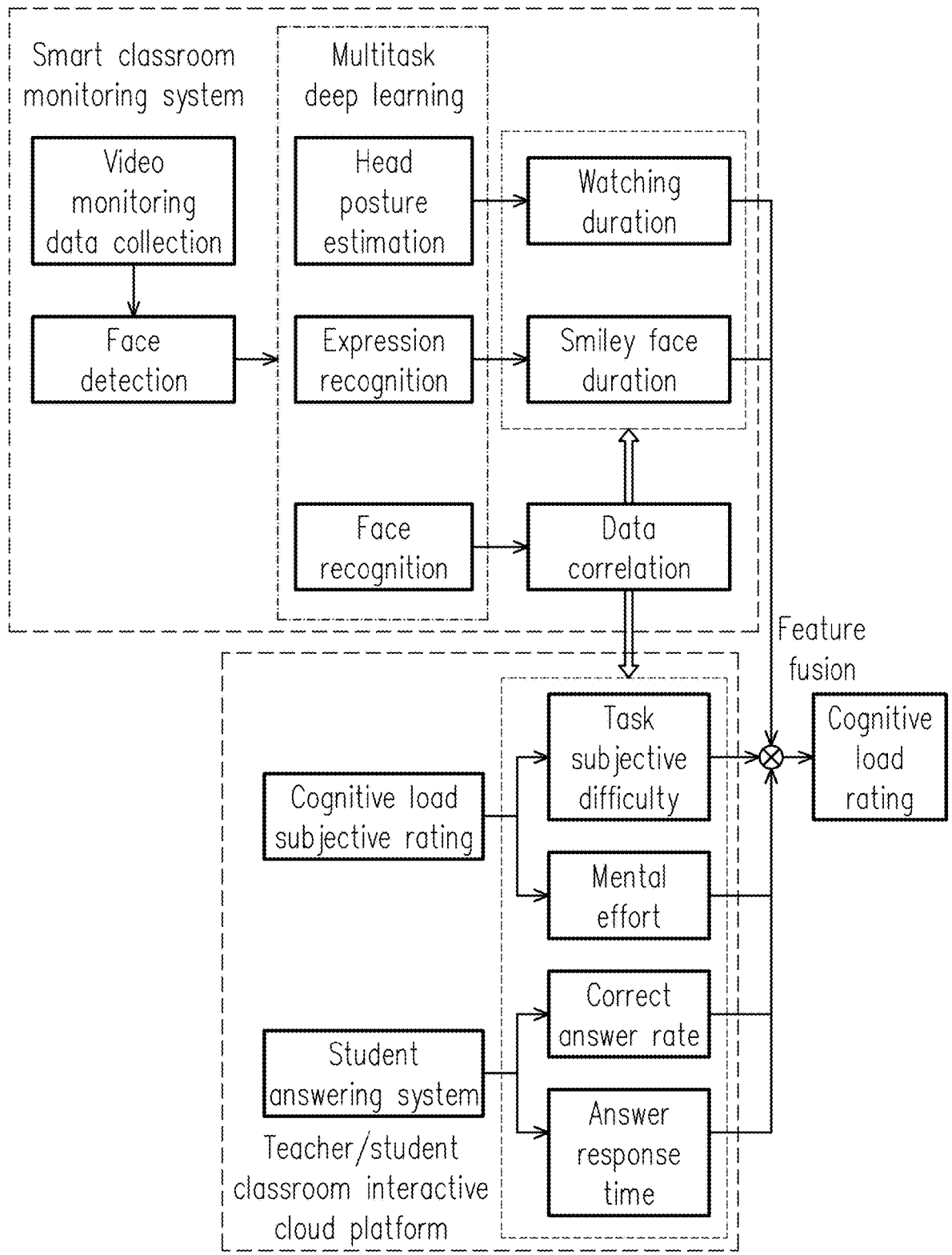
FIG. 1 is a flowchart of a classroom teaching cognitive load measurement method of the invention.
Figure 2:
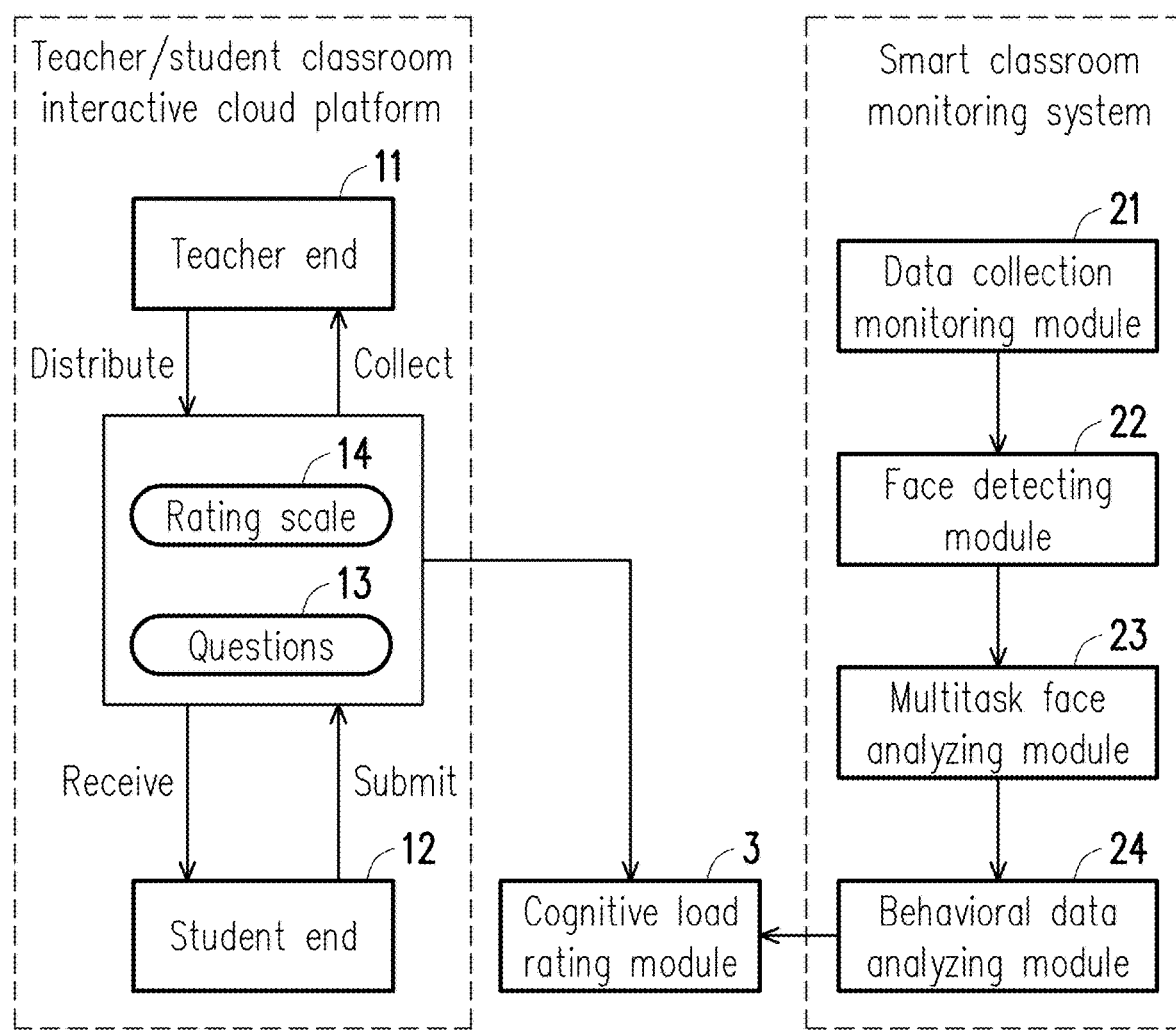
FIG. 2 is a structure diagram of a preferred embodiment of a classroom teaching cognitive load measurement system of the invention.

As shown in FIG. 1, the technical idea of the classroom teaching cognitive load measurement method of the invention includes: recording an answer response time and a correct answer rate of a student when completing the task; receiving a cognitive load self-rating scale filled in by the student when completing the task, and analyzing a mental effort and a task subjective difficulty of the student by a rating scale; collecting a student classroom performance video to obtain a face region through a face detection; performing a face recognition, an expression recognition and a head pose estimation on the obtained face region; counting a smiley face duration of the student according to a result of the expression recognition and counting a watching duration of the student according to a result of the head pose estimation; fusing six indexes including the answer response time, the correct answer rate, the mental effort, the task subjective difficulty, the smiley face duration and the watching duration into a characteristic vector by using a result of the face recognition; and inputting the fused feature to a trained classifier to identify a classroom cognitive load level of the student.

The classroom teaching cognitive load measurement system provided by the invention includes the following. A task completion feature collecting module records an answer response time and a correct answer rate of a student when completing a task. A cognitive load self-rating collecting module receives a cognitive load self-rating scale input by the student when completing the task, and quantifies and analyzes a mental effort and a task subjective difficulty of the student by the cognitive load self-rating scale. The cognitive load self-rating collecting module may be implemented as a hardware or may be processed by a processor, or a combination of the two. An expression and attention feature collecting module collects a student classroom performance video to obtain a face region through a face detection, performs a face recognition, an expression recognition and a head pose estimation on the obtained face region, counts a smiley face duration of the student according to a result of the expression recognition and counting a watching duration of the student according to a result of the head pose estimation. The expression and attention feature collecting module may be implemented as a hardware or may be processed by a processor, or a combination of the two. A feature fusion module fuses six indexes including the answer response time, the correct answer rate, the mental effort, the task subjective difficulty, the smiley face duration and the watching duration into a characteristic vector. The feature fusion module may be implemented as a hardware or may be processed by a processor, or a combination of the two. A cognitive load determining module inputs the characteristic vector to a trained classifier to identify a classroom cognitive load level of the student. The cognitive load module may be implemented as a hardware or may be processed by a processor, or a combination of the two.

The task completion feature collecting module includes a teacher end, a student end and a data processing center. The teacher end may be an office computer or a notebook computer installed with a cloud platform teacher end APP for teachers to distribute interactive questions and collect student answers. The student end may be a mobile portable device (e.g., a cell phone, or a tablet computer) installed with a cloud platform student end APP for students to receive the interactive questions and a rating scale and submit question answers and a scale test result. The data processing center is used to record a response time taken by the student to answer the questions and analyze a correct rate of the answers from the student.

The cognitive load self-rating scale may adopt a PAAS scale, which mainly includes two dimensions for evaluating the mental effort and the task difficulty. For example, a 9-level scoring system may be adopted to ask the students to select a suitable number from 1 to 9 according to their own feelings after completing a learning task. 1 to 9 represent progressively increased levels of the mental effort and material difficulty; 1 represents least effort and low difficulty; 5 represents moderate effort and medium difficulty; 9 represents high effort and high difficulty. With an internal consistency reliability coefficient $\alpha=0.74$, the reliability of the rating scale is relatively high. As long as it is a table that can reflect the cognitive load, the cognitive load self-rating scale is not limited to the PAAS scale.

The expression and attention feature collecting module includes a monitoring data collecting module, a face detecting module, a multitask face analyzing module and a behavioral data analyzing module.

The monitoring data collecting module is composed of a plurality of cameras installed on a classroom ceiling. Each camera is responsible for capturing a scene image of a specific region. Shooting scenes of the cameras cover the entire classroom scene as much as possible so the scene image of a monitoring region containing multiple students can be collected.

The face detecting module is used to detect the face region from the scene image. The cognitive load self-rating collecting module may be implemented as a hardware or may be processed by a processor, or a combination of the two. The face detection may adopt methods including a hierarchical cascading AdaBoost, a Hidden Markov Model (HMM), SVM and the like, and a feature used for the detection may be a Haar feature, a Sobel feature, a sparse feature, and the like.

The multitask face analyzing module is used in the face recognition, the expression recognition and the head pose estimation. The multitask face analyzing module may be implemented as a hardware or may be processed by a processor, or a combination of the two. Models of said three tasks can be constructed separately, and can adopt any one of recognition and pose estimation methods in the prior art. The invention provides a preferred method for achieving a better estimation correct rate.

A preferred specific implementation of the invention is as follows.

Figure 3:
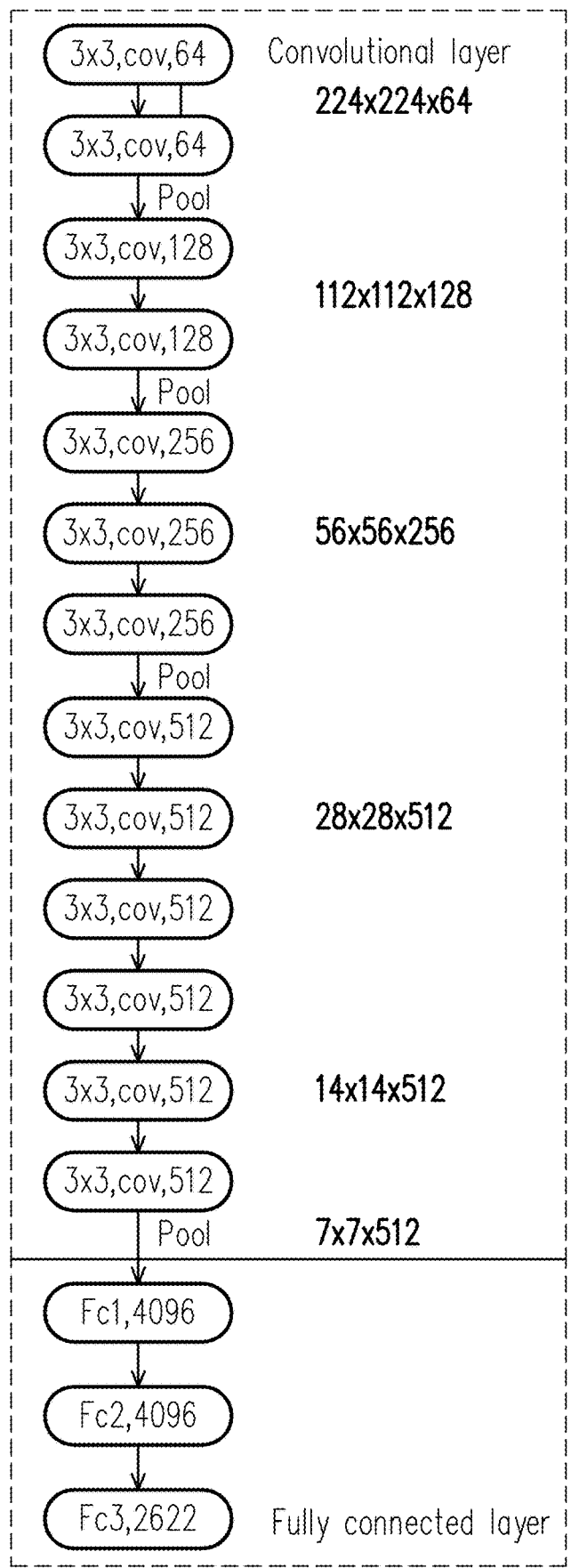
FIG. 3 is a structure diagram of a vgg-face model.

(231) A deep learning method is used to train a VGG (Visual Geometry Group) model, and a network result of the VGG model is shown in FIG. 3. The first 13 layers are convolution layers, and the last three layers are fully connected layers FC1, FC2 and FC3. Sample data used for training is a vgg-face face database. The trained model can be used to recognize a target in the vgg-face face database.

(232) A fine-tuning method is used to train the model for the face recognition used in a classroom. The specific steps are as follows. First of all, the model trained in (231) is initialized, then the initialized model is trained by using images of all the students in the classroom, and the trained model is used to recognize the students in the classroom. The face recognition is used to correlate data of a teacher/student classroom interactive cloud platform with a smart classroom monitor data for each person.

Figure 4:
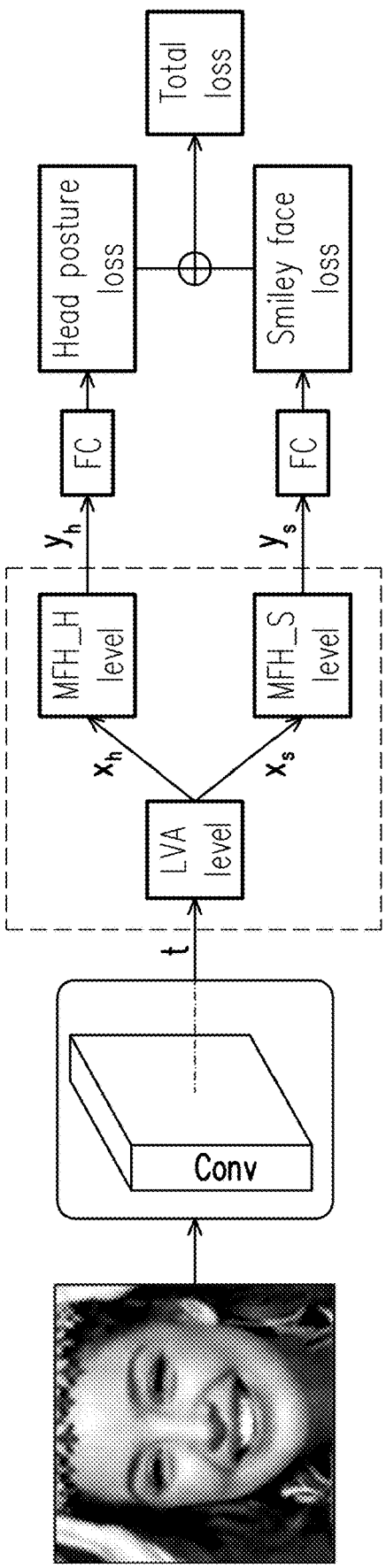
FIG. 4 is a flowchart of a multitask deep learning algorithm based on a hidden variable analysis.

(233) A deep learning model based on the hidden variable analysis is constructed for a face-related multitask training to estimate a head pose and an expression at the same time. The constructed model is shown in FIG. 4. The specific steps are as follows.

(2331) A VGG network having a structure similar to that of FIG. 3 is constructed, and parameters in the VGG network are initialized by model parameters trained in (232). Then, a first fully connected layer FC1 in the VGG network is replaced with an LVA layer. The role of the LVA layer adopting a hidden variable modeling is to minimize a mutual interference between hidden variable factors. Outputs of the LVA layer have two branches. A second fully connected layer (FC2) is replaced with an MFA_S layer and an MFA_H layer. The role of the MFA layers are to minimize an intraclass distance and maximize an interclass distance as much as possible in order to improve a discrimination between samples having different classes. The MFA layers comprises the MFA_S and the MFA_H layers. The MFA_S layer and the MFA_H layer are then connected to a third fully connected layer (FC3) respectively, and the two branches are used in a smiley face recognition and the head pose estimation, respectively. Loss functions of the two branches are $L_{smile}$ and $L_{head}$, respectively. A loss function of the entire network is: $L_{total}=L_{smile}+L_{head}$.

(2332) The LVA layer is trained. First, a hidden variable modeling $t=Us+Vh+\bar{t}+\varepsilon$ is performed on an observed quantity output by a convolution layer. s and h represent a smiley face feature hidden variable and a head pose feature hidden variable respectively. $\bar{t}$ represents a mean. $\varepsilon$ is a Gaussian noise. $\sigma$ is a variance. U and V are transformation matrixes. The samples are output to the models, and a model parameter $\theta=\{U, V, \bar{t}, \sigma\}$ is solved through a maximized likelihood function $L_{LVA}=\Sigma_i \ln p_\theta(t_i, h_j, s_k)$, wherein $\ln p_\theta(\ )$ is a logarithmic function indicating a likelihood of an i-th sample $t_i$ for having a head pose hidden variable $h_j$ and an expression hidden variable $s_k$ with the head pose belonging to a j-th class and the expression belonging to a k-th class. $\theta$ can be solved by adopting an EM algorithm, that is, an alternating iteration of an E step and an M step. A calculation formula of the E step is:

$$\langle s_k \rangle = \frac{U^T \overset{-1}{\Sigma}}{M_k} \sum_{t_i \in M(k)} (t_i - \bar{t})$$

$$\langle h_j \rangle = \frac{V^T \overset{-1}{\Sigma}}{N_j} \sum_{t_i \in N(j)} (t_i - \bar{t})$$

$$\langle s_k s_k^T \rangle = \frac{I - U^T \overset{-1}{\Sigma} U}{\sqrt{M_k}} + \langle s_k \rangle \langle s_k \rangle^T$$

$$\langle h_j h_j^T \rangle = \frac{I - V^T \overset{-1}{\Sigma} V}{\sqrt{N_j}} + \langle h_j \rangle \langle h_j \rangle^T$$

$$\langle h_j s_k^T \rangle = \frac{-V^T \overset{-1}{\Sigma} U}{\sqrt{N_j M_k}} + \langle h_j \rangle \langle s_k \rangle^T$$

$$\langle s_k h_j^T \rangle = \frac{-U^T \overset{-1}{\Sigma} V}{\sqrt{N_j M_k}} + \langle s_k \rangle \langle h_j \rangle^T$$

wherein $\Sigma=\delta^2 I+UU^T+VV^T$. $N_j$ represents a sample size of the head pose being the j-th class. $M_k$ represents a sample size of the expression being the k-th class. N(j) represents a sample set of the head pose being the j-th class. M(k) represents a sample set of the expression being the k-th class.

A calculation formula of the M step is:

$$U = (C - DB^{-1}E)(A - FB^{-1}E)^{-1}$$

$$V = (D - CA^{-1}F)(B - EA^{-1}F)^{-1}$$

$$\sigma^2 = \frac{1}{n*d} \sum_i \{(t_i - \bar{t} - U\langle s_k \rangle - V\langle h_j \rangle)^T (t_i - \bar{t})\}$$

wherein n represents a total of trained samples, and d represents a feature dimension of an observed variation $t_i$.

Here, the parameters $A=\Sigma_i \langle s_k s_k^T \rangle$, $C=\Sigma_i (t_i - \bar{t}) \langle s_k \rangle^T$, $E=\Sigma_i \langle h_j s_k^T \rangle$ $B=\Sigma_i \langle h_j h_j^T \rangle$, $D=\Sigma_i (t_i - \bar{t}) \langle h_j \rangle^T$, $F=\Sigma_i \langle s_k h_j^T \rangle$.

After the training is completed, the outputs of the two branches of the LVA layer can be calculated according to trained parameters, and the output of the branch of the expression recognition is $x_s=W_s t+b_s$, wherein $W_s=U^T\Sigma^{-1}$, $b_s=U^T\Sigma^{-1}\bar{t}$. Similarly, the output of the branch of the head pose is $x_h=W_h t+b_h$, wherein $W_h=V^T\Sigma^{-1}$, $b_h=V^T\Sigma^{-1}\bar{t}$.

(2333) MFA layers are trained. For the branch of the expression recognition, that is, training the MFA_S layer, an input is $X_s$ and an output is $y_s=P_s^T x_s$. The role of the MFA layers is to find a parameter P that enables an optimization $$\arg\max_{P_s} \frac{tr(P_s^T S_b P_s)}{tr(P_s^T S_w P_s)}$$

by minimizing the intraclass distance as much as possible and maximizing the interclass distance, wherein $S_b$ is the interclass distance, and $S_w$ is the intraclass distance. Solving the optimization is equivalent to solve an eigenvalue decomposition: $S_b p_s = (S_w + \lambda I) p_s$, $\lambda$ is an eigenvalue, p is the eigenvector, I is a unit matrix. Similarly, the MFA_H layer can be trained with an output being $X_h$, an output being $y_h = P_h^T x_h$, $P_h$ being the eigenvector.

(2334) Parameters in other deep neural network layers based on the hidden variable analysis are trained. After (2332) and (2333) are executed, the parameters of those two layers are fixed. A total loss function $L_{total}$ set in (2331) is solved to fine-tune the parameters of the other network layers.

(2335) The model obtained after an iteration of (2332), (2333) and (2334) is executed several times is the model finally used for the expression recognition and the head pose estimation.

The behavioral data analyzing module is used to count a duration of the smiley face detection, determine a watching direction of the student by using a result of the head pose estimation, and count the watching duration for watching the learning task.

A cognitive load rating module fuses the answer response time, the correct answer rate, the mental effort, the task subjective difficulty, the smiley face duration and the watching duration into a characteristic vector and inputs the characteristic vector in a trained classifier for a cognitive load rating. The classifier adopted by the cognitive load rating may be one of a self-organizing neural network, an Elman neural network and a support vector machine. In the embodiments of the invention, a recognition class of the classifier is set to 3 with an output result being 1, 2 or 3, which are corresponding to three levels of high, medium or low levels of a cognitive load level, respectively.

Those skilled in the art will readily appreciate that any modifications, equivalent substitutions and improvements made within the spirit and scope of the invention are intended to be included within the scope of the invention. Any modifications, equivalent substitutions and improvements made within the spirit and scope of the invention are intended to be included within the scope of the invention.

What is claimed is:

1. A classroom teaching cognitive load measurement system, comprising:
    a task completion feature collecting module comprising a first computer, a second computer and a data processing center for recording an answer response time and a correct answer rate of a student when completing a task;
    a cognitive load self-rating collecting module for receiving a cognitive load self-rating scale input by the student when completing the task indicating a degree of mental effort and a task subjective difficulty of the student by the cognitive load self-rating scale;
    an expression and attention feature collecting module comprising a plurality of cameras and a first processor, for collecting a student classroom performance video to obtain a face region through a face detection; performing a face recognition on a region containing faces to complete an expression recognition and a head pose estimation; counting a smiley face duration of the student according to a result of the expression recognition and counting a watching duration of the student according to a result of the head pose estimation;
    a second processor configured to form a characteristic vector comprising six indexes including the answer response time, the correct answer rate, the degree of mental effort, the task subjective difficulty, the smiley face duration and the watching duration; and
    a third processor configured to input the characteristic vector to a trained classifier for a cognitive load rating to identify a classroom cognitive load level of the student.

2. The classroom teaching cognitive load measurement system of claim 1, wherein the expression and attention feature collecting module comprises:
    a monitoring data collecting module comprising the plurality of cameras for capturing a scene image in a classroom;
    the first processor, configured to:
    detect the face region from the scene image; and
    perform the face recognition, the expression recognition and the head pose estimation by using models pre-trained.

3. The classroom teaching cognitive load measurement system of claim 2, wherein the model for the face recognition is trained by:
    (1) using a visual geometry group (vgg)-face face database, and selecting a VGG model to train the model for the face recognition for a first time; and
    (2) optimizing the model for the face recognition obtained from the training step (1) by using a face image of the student in the classroom.

4. The classroom teaching cognitive load measurement system of claim 3, wherein the model for the expression recognition and the head pose estimation is trained by:
    (3) a network initialization, wherein a VGG network is constructed and parameters in the VGG network are initialized by parameters of the model for the face recognition trained in the step (2); a first fully connected layer (FC1) in the VGG network is replaced with a latent variable analysis (LVA) layer; a second fully connected layer (FC2) is replaced with two marginal Fisher analysis layers: MFA_S layer and an MFA_H layer, which are two branches of an output of the LVA layer; the MFA_S layer and the MFA_H layer are then connected to a third fully connected layer (FC3) respectively, and the two branches are used in a smiley face recognition and the head pose estimation, respectively;
    (4) an LVA layer training, including: performing a hidden variable modeling $t = Us + Vh + \bar{t} + \varepsilon$ on an observed quantity output by a convolution layer, t being the observed quantity output by the convolution layer, s and h representing a smiley face feature hidden variable and a head pose feature hidden variable respectively, $\bar{t}$ representing a mean, $\varepsilon$ being a Gaussian noise, $\sigma$ being a variance, U and V being transformation matrixes; outputting samples to the model for the smiley face recognition and head pose estimation, and solving a model parameter $\theta = \{U, V, \bar{t}, \sigma\}$ through a maximized likelihood function $L_{LVA} = \Sigma_i \ln p_\theta(t_i, h_j, s_k)$, wherein a logarithmic function $\ln p_\theta()$ indicates a likelihood of an i-th sample $t_i$ for having a head pose hidden variable $h_j$ with a head pose belonging to a j-th class and an expression hidden variable $s_k$ with an expression belonging to a k-th class; calculating outputs of the two branches of the LVA layer according to trained parameters, the output of the branch of the expression recognition being $x_s = W_s t + b_s$, wherein $W_s = U^T \Sigma^{-1} \bar{t}$; the output of the branch of the head pose being $x_h = W_h t + b_h$, wherein $W_h = V^T \Sigma^{-1}$, $b_h = V^T \Sigma^{-1} \bar{t}$, and a superscript T represents a transposition;
    (5) MFA layers training, including: based on a MFA_S layer having an input being the output $X_s$ of the branch of the expression recognition and an output being $y_s=P_s^T x_s$, finding an eigenvector $P_s$ that enables an optimization $$\arg\max_{P_s} \frac{tr(P_s^T S_b P_s)}{tr(P_s^T S_w P_s)}$$

by minimizing an intraclass distance and maximizing an interclass distance, wherein $S_b$ is the interclass distance, and $S_W$ is the intraclass distance; solving the optimization is equivalent to solve an eigenvalue decomposition: $S_b p_s = (S_w + \lambda I) p_s$ with $\lambda$ being an eigenvalue, $P_s$ being the eigenvector, I being a unit matrix; training an MFA_H layer in the same way with an output being the output $X_h$ of the branch of the head pose, an output being $y_h = P_h^T x_h$, and $P_h$ being the eigenvector; and (6) fixing parameters of the LVA layer and the MFA layers, fine-tuning parameters of other network layers to achieve minimizing a total loss function output by the two branches of the LVA layer, so as to obtain the model for the expression recognition and the head pose estimation.

5. The classroom teaching cognitive load measurement system of claim 4,
solving a parameter $\theta=\{U,V,t,\sigma\}$ by adopting an EM algorithm, that is, an alternating iteration of an E step and an M step, wherein
a calculation formula of the E step is:

$$\langle s_k \rangle = \frac{U^T \Sigma^{-1}}{M_k} \sum_{t_i \in M(k)} (t_i - \bar{t})$$

$$\langle h_j \rangle = \frac{V^T \Sigma^{-1}}{N_j} \sum_{t_i \in N(j)} (t_i - \bar{t})$$

$$\langle s_k s_k^T \rangle = \frac{I - U^T \Sigma^{-1} U}{\sqrt{M_k}} + \langle s_k \rangle \langle s_k \rangle^T$$

$$\langle h_j h_j^T \rangle = \frac{I - V^T \Sigma^{-1} V}{\sqrt{N_j}} + \langle h_j \rangle \langle h_j \rangle^T$$

$$\langle h_j s_k^T \rangle = \frac{-V^T \Sigma^{-1} U}{\sqrt{N_j M_k}} + \langle h_j \rangle \langle s_k \rangle^T$$

$$\langle s_k h_j^T \rangle = \frac{-U^T \Sigma^{-1} V}{\sqrt{N_j M_k}} + \langle s_k \rangle \langle h_j \rangle^T$$

wherein $\Sigma = \delta^2 I + UU^T + VV^T$, $N_j$ represents a sample size of the head pose being the j-th class, $M_k$ represents a sample size of the expression being the k-th class, $N(j)$ represents a sample set of the head pose being the j-th class, and $M(k)$ represents a sample set of the expression being the k-th class; and
a calculation formula of the M step is:

$$U = (C - DB^{-1}E)(A - FB^{-1}E)^{-1}$$

$$V = (D - CA^{-1}F)(B - EA^{-1}F)^{-1}$$

$$\sigma^2 = \frac{1}{n*d} \sum_i \{(t_i - \bar{t} - U\langle s_k \rangle - V\langle h_j \rangle)^T (t_i - \bar{t})\}$$

wherein n represents a total of trained samples, and d represents a feature dimension of an observed variation $t_i$,
wherein the parameters $A = \Sigma_i \langle s_k s_k^T \rangle$, $C = \Sigma_i (t_i - \bar{t}) \langle s_k \rangle^T$, $E = \Sigma_i \langle h_j s_k^T \rangle$ $B = \Sigma_i \langle h_j h_j^T \rangle$, $D = \Sigma_i (t_i - \bar{t}) \langle h_j \rangle^T$, $F = \Sigma_i \langle s_k h_j^T \rangle$.

6. The classroom teaching cognitive load measurement system of claim 1, wherein the first processor adopts from a hierarchical cascading AdaBoost, a Hidden Markov Model (HMM) or a Support Vector Machine (SVM), and a feature used for a detection is selected from a Haar feature, a Sobel feature or a sparse feature.

7. The classroom teaching cognitive load measurement system of claim 1, wherein the classifier adopted by the third processor is selected from a self-organizing neural network, an Elman neural network or a support vector machine.

8. The classroom teaching cognitive load measurement system of claim 2, wherein the first processor adopts from a hierarchical cascading AdaBoost, a Hidden Markov Model (HMM) or a Support Vector Machine (SVM), and a feature used for a detection is selected from a Haar feature, a Sobel feature or a sparse feature.

9. The classroom teaching cognitive load measurement system of claim 3, wherein the first processor adopts from a hierarchical cascading AdaBoost, a Hidden Markov Model (HMM) or a Support Vector Machine (SVM), and a feature used for a detection is selected from a Haar feature, a Sobel feature or a sparse feature.

10. The classroom teaching cognitive load measurement system of claim 4, wherein the first processor adopts from a hierarchical cascading AdaBoost, a Hidden Markov Model (HMM) or a Support Vector Machine (SVM), and a feature used for a detection is selected from a Haar feature, a Sobel feature or a sparse feature.

11. The classroom teaching cognitive load measurement system of claim 5, wherein the first processor adopts from a hierarchical cascading AdaBoost, a Hidden Markov Model (HMM) or a Support Vector Machine (SVM), and a feature used for a detection is selected from a Haar feature, a Sobel feature or a sparse feature.

12. The classroom teaching cognitive load measurement system of claim 2, wherein the classifier adopted by the third processor is selected from a self-organizing neural network, an Elman neural network or a support vector machine.

13. The classroom teaching cognitive load measurement system of claim 3, wherein the classifier adopted by the third processor is selected from a self-organizing neural network, an Elman neural network or a support vector machine.

14. The classroom teaching cognitive load measurement system of claim 4, wherein the classifier adopted by the third processor is selected from a self-organizing neural network, an Elman neural network or a support vector machine.

15. The classroom teaching cognitive load measurement system of claim 5, wherein the classifier adopted by the third processor is selected from a self-organizing neural network, an Elman neural network or a support vector machine.

16. A method for classroom teaching cognitive load measurement, the method comprising:

recording an answer response time and a correct answer rate of a student when completing a task;

receiving a cognitive load self-rating scale input by the student when completing the task indicating a degree of mental effort and a task subjective difficulty of the student by the cognitive load self-rating scale;

collecting a student classroom performance video to obtain a face region through a face detection; performing a face recognition on a region containing faces to complete an expression recognition and a head pose estimation; counting a smiley face duration of the student according to a result of the expression recognition and counting a watching duration of the student according to a result of the head pose estimation;

forming a characteristic vector comprising six indexes including the answer response time, the correct answer rate, the degree of mental effort, the task subjective difficulty, the smiley face duration and the watching duration and inputting the characteristic vector to a trained classifier for a cognitive load rating to identify a classroom cognitive load level of the student.

\* \* \* \* \*